United States Patent [19]
Yau

[11] Patent Number: 6,010,977
[45] Date of Patent: Jan. 4, 2000

[54] PREPARATION OF SUB-VISUAL MOLECULAR AGGREGRATES COMPOSED OF ANTIMONY PHOSPHATE DERIVATIVES

[75] Inventor: Cheuk Chung Yau, Kingsport, Tenn.

[73] Assignee: Eastman Chemical Company, Kingsport, Tenn.

[21] Appl. No.: 09/103,785

[22] Filed: Jun. 24, 1998

[51] Int. Cl.[7] .............................. B01J 27/14; B01J 27/16; B01J 27/18; B01J 27/186
[52] U.S. Cl. ............................................................ 502/208
[58] Field of Search .............................................. 502/208

[56] References Cited

U.S. PATENT DOCUMENTS

| | | |
|---|---|---|
| 3,387,925 | 6/1968 | Vanstrom et al. . |
| 4,292,294 | 9/1981 | Patil et al. . |
| 4,316,856 | 2/1982 | Guttmann et al. ...................... 585/630 |
| 4,324,772 | 4/1982 | Conn et al. . |

FOREIGN PATENT DOCUMENTS

| | | |
|---|---|---|
| 0 641 740 A1 | 3/1995 | European Pat. Off. . |
| WO 94/01361 A1 | 1/1994 | WIPO . |

*Primary Examiner*—Elizabeth D. Wood
*Attorney, Agent, or Firm*—Karen A. Harding; Harry J. Gwinnell

[57] ABSTRACT

The present invention relates to a process comprises mixing, at temperatures between about about 90° C. to 300° C., a first reactant solution comprising less than about $5 \times 10^{-3}$ moles/l of at least one antimony compound and at least one first diol having having 2 to about 16 carbon atoms with a second reactant solution comprising less than about $30 \times 10^{-3}$ moles/l of at least one phosphorus stabilizer compound and at least one second diol to form sub-visual molecular aggregates comprising antimony phosphate derivatives. Sub-visual molecular aggregates comprising antimony phosphate derivatives which are stable in suspension are also disclosed.

22 Claims, 9 Drawing Sheets

6,010,977

PREPARATION OF SUB-VISUAL MOLECULAR AGGREGRATES COMPOSED OF ANTIMONY PHOSPHATE DERIVATIVES

FIELD OF THE INVENTION

Sub-visual, molecular aggregates of metal phosphate derivatives are very desirable for use as catalysts for polymers to achieve high clarity. Their high volume-to-surface-area ratios are important for achieving good polymerization rates. They also have potential use in ceramics, paints, inks and coatings. The present invention relates to a simple yet highly efficient method to produce sub-visual molecular aggregates of metal phosphate derivatives. The resulting clear suspensions remain stable and clear to the unaided eyes for extended periods of time.

BACKGROUND OF THE INVENTION

Small particles are normally prepared by pulverization. This method produces particles of irregular shapes and with a wide particle size distribution. The particles, even after milling, are normally big enough to scatter light as to render them visible to the naked eyes. In a number of cases, the disclosed procedure called for, after reaction and precipitation, further steps of drying, calcination and pulverization. In other cases, strict control of pH during the precipitation step was required.

EP 0 641 740 A1 discloses a process for the preparation of crystalline perovskite powders by precipitation. The procedure involves the introduction of an aqueous solution of mixed inorganic metal salts or organometallic compounds of a claimed group of elements and elements from a second group of claimed elements, into a stirred aqueous solution of inorganic or organic base preheated to 70–100° C. at constant $OH^-$ concentrations. Thus, the use of a basic solution; and the careful control of $OH^-$ concentration is required.

WO 94/01361 discloses a method of making nanometer-sized particles, by continuously flowing a solution of a precursor in a solvent through a heated vessel and chemically reacting the solution to form particles, followed by flow into a cooled region for recovery of the particles. Quenching in a cooled region is an additional step requiring additional equipment.

U.S. Pat. No. 4,324,772; discloses a continuous process for producing hydroxyapatite from calcium oxide in water and phosphoric acid which comprises a two-stage reaction in which pH control and reactant flow are carefully regulated. Control of the first stage pH between about 9.5 to about 11 and the second stage pH between 7.0 to 7.4 is required. Vigorous agitation is disclosed as critical.

U.S. Pat. No. 3,387,925 discloses a batch process of tricalcium phosphate from lime (calcium oxide) and phosphoric acid and found that small particle size may be produced by controlling the final pH, the reaction temperature and the rate of addition of the reactants. The disclosed temperature is between 20 to 50° C. and the reactions were carried out in an aqueous system. The phosphoric acid is added to the lime as quickly as possible. The particle sizes were between −20 and +40 (425 microns) U.S. Standard Mesh. Smaller particles were not disclosed.

U.S. Pat. No. 4,292,294 disclosed a process to produce submicron-sized particles of spinel of iron and other metals involving reacting an aqueous solution of ferrous sulfate and a metal nitrate with a basic solution at room temperature and subsequent exposure to elemental oxygen.

DESCRIPTION OF THE INVENTION

Figure 1:
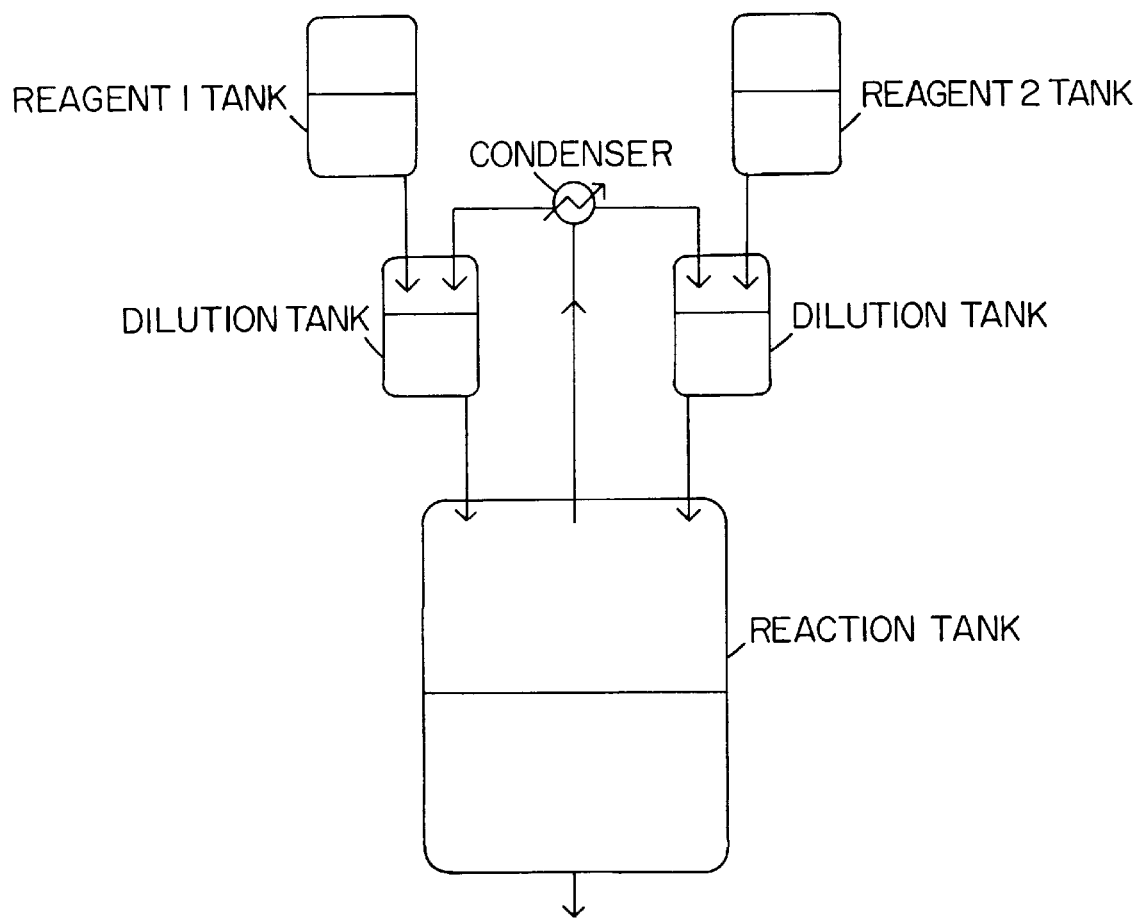
FIG. 1 is a flow diagram wherein the condensate from the condenser is directed to at least one of the reactants.

The present invention relates to the preparation of sub-visual molecular aggregates composed of antimony phosphate derivatives. The process comprises mixing, at temperatures between about 90° C. to about 300° C., a first reactant solution comprising less than about $5\times10^{-3}$ moles/l of at least one antimony compound and at least one first diol having 2 to about 16 carbon atoms with a second reactant solution comprising less than about $30\times10^{-3}$ moles/l of at least one phosphorus stabilizer compound and at least one second diol. The resultant mixture is stable and remains clear to the naked eye for months after preparation. The process of the present invention allows both high dilution mixing of reactants and production of a relatively high concentration of the resulting mixture.

Suitable antimony compounds in the the present invention include any trivalent or pentavalent antimony compound known in the art. Examples of specific antimony compounds include antimony triacetate, antimony trioxide, antimony ethylene glycoxide, and the like.

The phosphorus stabilizer compound utilized in the process of the present invention can be phosphoric acid, phosphorous acid, an aryl phosphate ester, an alkyl phosphate ester, an aryl phosphite, an alkyl phosphite, or a mixture thereof. Phosphoric and phosphorous acids may be preferred because they are readily available and inexpensive. Examples of suitable phosphate esters are triethyl phosphate, trimethyl phosphate, diethyl hydrogen phosphate, ethyl dihydrogen phosphate, dimethyl hydrogen phosphate, methyl dihydrogen phosphate, triphenyl phosphate, and mixtures thereof. The reaction products of alkyl phosphate and ethylene glycol are equivalents to their corresponding phosphorus stabilizers. These include, for example, tris (2-hydroxyethyl) phosphate, bis (2-hydroxyethyl) hydrogen phosphate, 2-hydroxyethyl dihydrogen phosphate. The alkyl and aryl phosphites corresponding to the examples of phosphate esters and their reaction products with ethylene glycol listed above are also suitable phosphorus stabilizer compounds.

The antimony compound and phosphorus stabilizer compounds are mixed with at least one diol to form the first and second reactant solutions. Suitable diols include aliphatic, cycloaliphatic or aromatic diprotic alcohol having from 2 to about 16 carbon atoms. Moreover different diols may be used to formed the first and second reaction solutions. Aliphatic diols are preferred. Suitable examples of aliphatic diols include ethylene glycol, 2,2,4,4-tetramethyl-1,3-cyclobutanediol, 1,2-propanediol, 1,3-propanediol, neopentyl glycol, 1,4-butanediol, 1,5-pentanediol, 1,6-hexanediol, trans- or cis-1,4-cyclohexanedimethanol, p-xylene glycol, and mixtures thereof. In one preferred embodiment the first and second reactant solution comprise the same diol, which preferably comprises ethylene glycol, which can optionally be modified with at least one of the above listed diols.

The present invention works over a wide range of concentrations and temperatures, although high dilution is preferred. Generally, the effective concentration of the antimony or phosphorus ion at mixing should be less than about $5 \times 10^{-3}$ moles/l and preferably less than about $4.3 \times 10^{-3}$ moles/l. The mixture which results from mixing the first and second reactant solutions comprises sub-visual antimony phosphate derivative particles which are capable of staying in suspension for extended periods of time. Preferably said particles are capable of staying in suspension for at least one week, and preferably at least two weeks, and in some cases even greater than one month. The stability of the suspension may be improved by creating smaller antimony phosphate particles and by selecting the phosphate and antimony compounds so that the compounds tend not to aggregate in solution.

The reaction temperature should be from about 20° C. to about 300° C., and preferably about 90° C. to about 300° C. and more preferably from about 130 to about 220° C. and most preferably from about 140 to about 180° C. It should be appreciated that lower temperatures may require lower concentrations to achieve the desired mixture.

When a solution of antimony triacetale in ethylene glycol or antimony oxide in ethylene glycol was mixed with an ethylene glycol solution of phosphoric acid at room temperature, a white precipitate of antimony phosphate was formed immediately. However, when the mixing was performed according to our procedure, essentially at the chosen temperatures and concentrations, no precipitate was observed by the naked eyes. The exact constitution of the suspension is unknown, although by the principle of conservation of matter, it contains antimony, phosphorus and oxygen. We describe it as a mixture of molecular aggregates of antimony phosphate derivatives. Antimony phosphate derivatives refers to a basic constitution of antimony phosphate, however, the phosphate anion can take the form of glycol phosphate esters (for example, ethylene glycol phosphate esters) be it mono-, di- or tri- substituted. It is known that phosphate esters can form when phosphoric acid is heated with alcohols or glycols. It is also known that phosphate esters undergo thermal decomposition via beta-elimination or thermal rearrangement depending on the structure of the phosphate esters. Therefore, the product is expected to be a mixture of antimony phosphate derivatives. The phosphate can be in the form of polyphosphates and polyphosphate esters as shown in Formula I below.

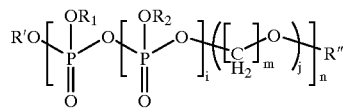

wherein m and n are integers of at least one, preferably from 1 to 50 and more preferably from 1 to 10 and i and j are zero or integers of at least 1, preferably from 0 to 50 and more preferably from 0 to 10; R' and R" are the same or different and are selected from H, alkyl and aryl; and $R_1$ and $R_2$ the 1 5 same or different and are selected from H, alkyl, aryl, hydroxy and alkyl ether. Preferable structures include R', R", R1 and R2 independently selected from H and alkyl groups having 1–5 carbon atoms.

For the purposes of this invention "alkyl" means straight or branched, saturated and unsaturated groups having 1 to about 20 carbon atoms. Preferably alkyl groups are saturated. "Aryl" means substituted and unsubstitued aryl groups have between 6 and 14 carbons in the ring structure. "Alkyl ether" means ethers having 1–10 carbon atoms and at least one additional ether linkage. "Hydroxy" means groups having 1–10 carbon atoms and at least one hydroxy group.

From the literature cited above, most of the references referred to milky appearance of the resulting mixtures. Some mentioned isolation of products through filtration. These indicated that the particles were not subvisual. Therefore, it is unexpected that by choosing the right concentrations and temperatures, a clear liquid can be obtained. The suspended molecular aggregates are so small that light scattering is minimal and the resulting suspension is clear to the naked eyes. These molecular aggregates can be isolated for analyses by ultra-centrifugation. Examination by transmission electron microscopy revealed the presence of particles that are so small that they are invisible to the unaided eyes. It is also unexpected that the suspension remains stable without precipitation so that the liquid remains clear to the unaided eyes months after preparation.

The general scheme is amenable to both batch and continuous processes. The invention is also applicable to a process wherein (referring to FIG. 1) the condensate from the condenser is directed to only one of the reactants while the other reactant is at a fixed concentration. This invention also applies to the situation where the reflux to the condenser is a total take off or a partial reflux. The use of the dilution tanks is optional. The condensate can be added to the stream of the reagents 1 and 2 without using a dilution tank. The degree of dilution can be varied by varying the proportion of the reagents to the condensate.

The scheme applies to the use of a variety of carriers or solvents. The reflux temperature can be controlled by means of choosing the proper pressure of the reaction system. The pressure can be from positive pressures to pressures lower than atmospheric pressure.

Figure 2:
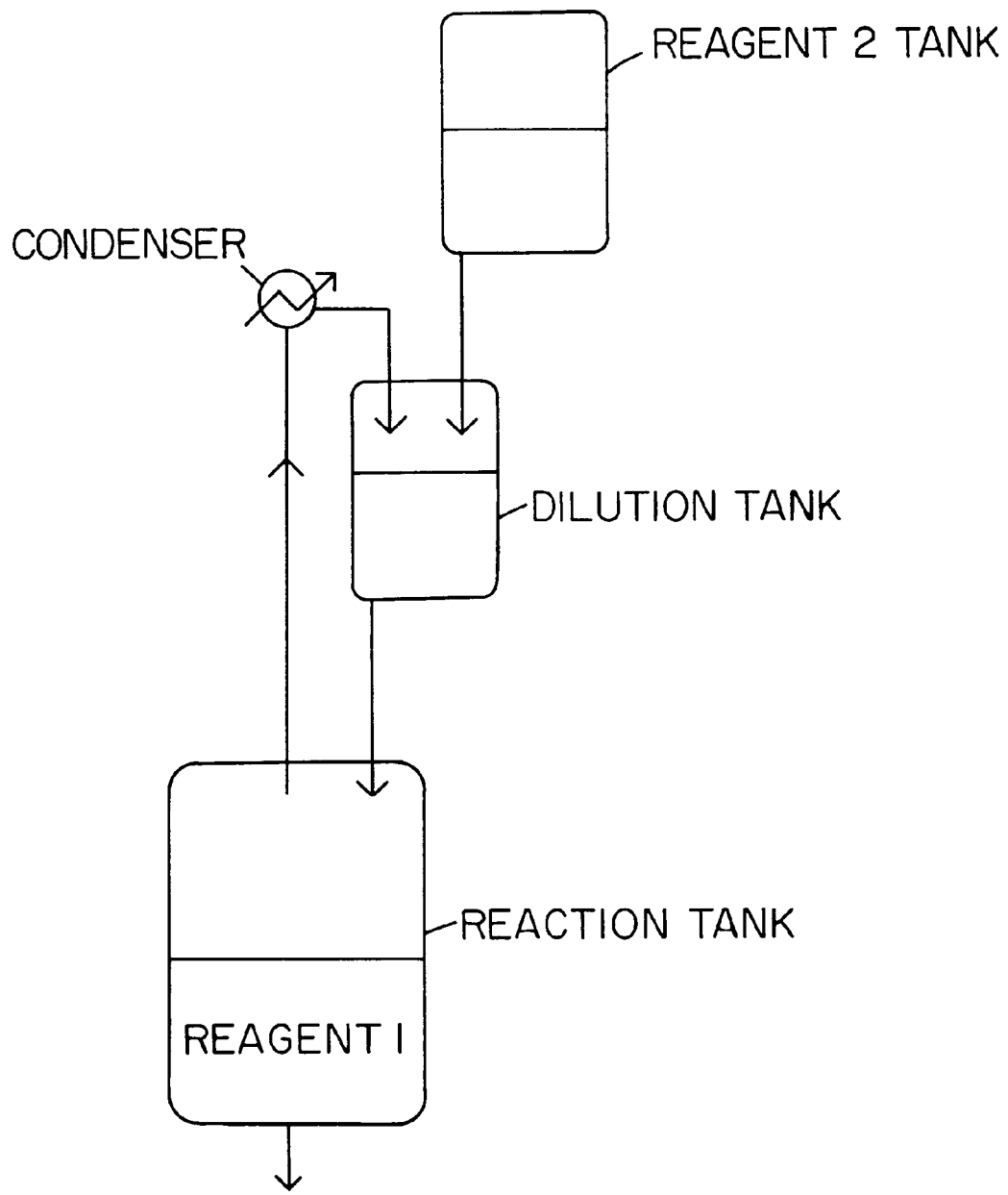
FIG. 2 is a flow diagram showing a batch reaction tank, reagent and dilution tanks.

A further modification of having only one reactant in the high dilution state in a batch process is also possible and the scheme is shown in FIG. 2. Reagent 1 is in the reaction tank from the start. Reagent 2 is added to the reaction tank through the dilution tank.

The order of addition of reagents (reagent 1 and reagent 2) can be reversed. For example, referring to FIG. 2, reagent 1 can be phosphoric acid in ethylene glycol while reagent 2 is antimony ethylene glycoxide in ethylene glycol; or reagent 1 can be antimony ethylene glycoxide in ethylene glycol while reagent 2 is phosphoric acid in ethylene glycol.

Figure 3:
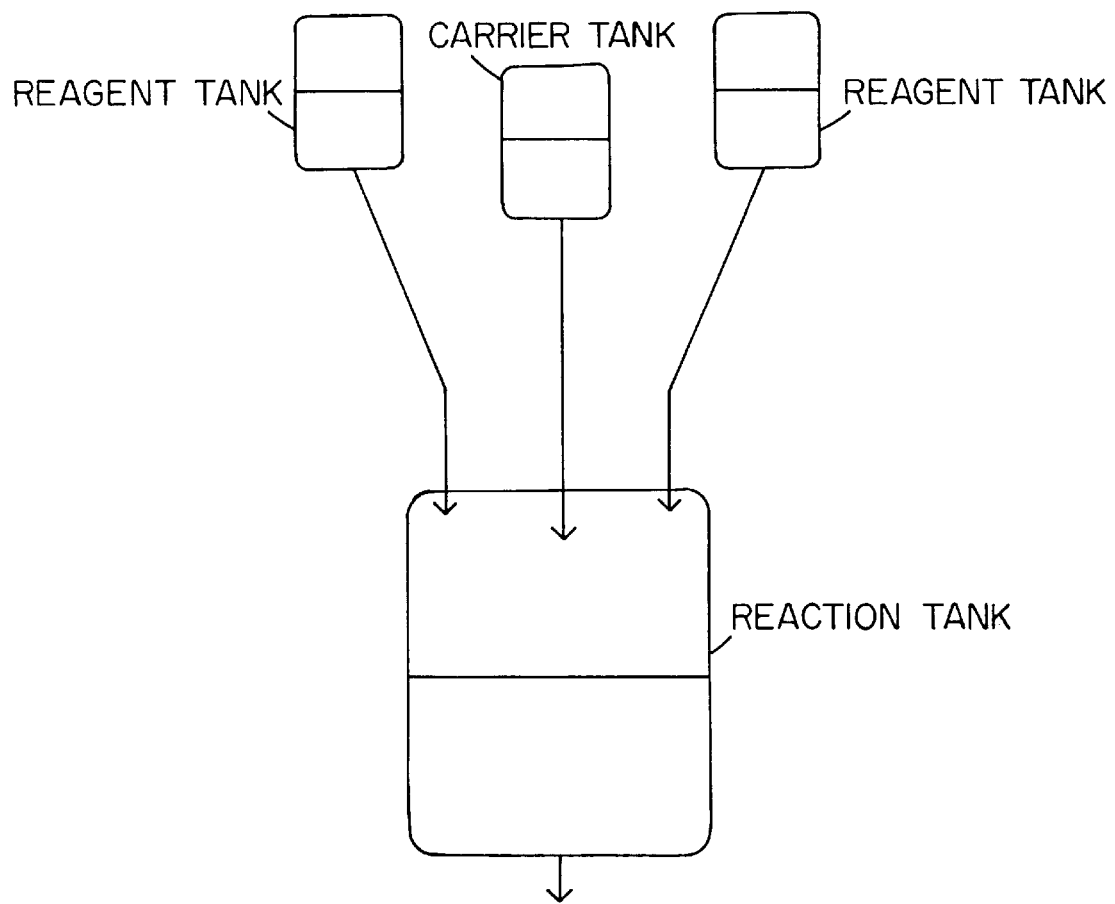
FIG. 3 is a flow diagram direct dilution via the addition of carrier or solvent directly to the reaction tank.
Figure 4:
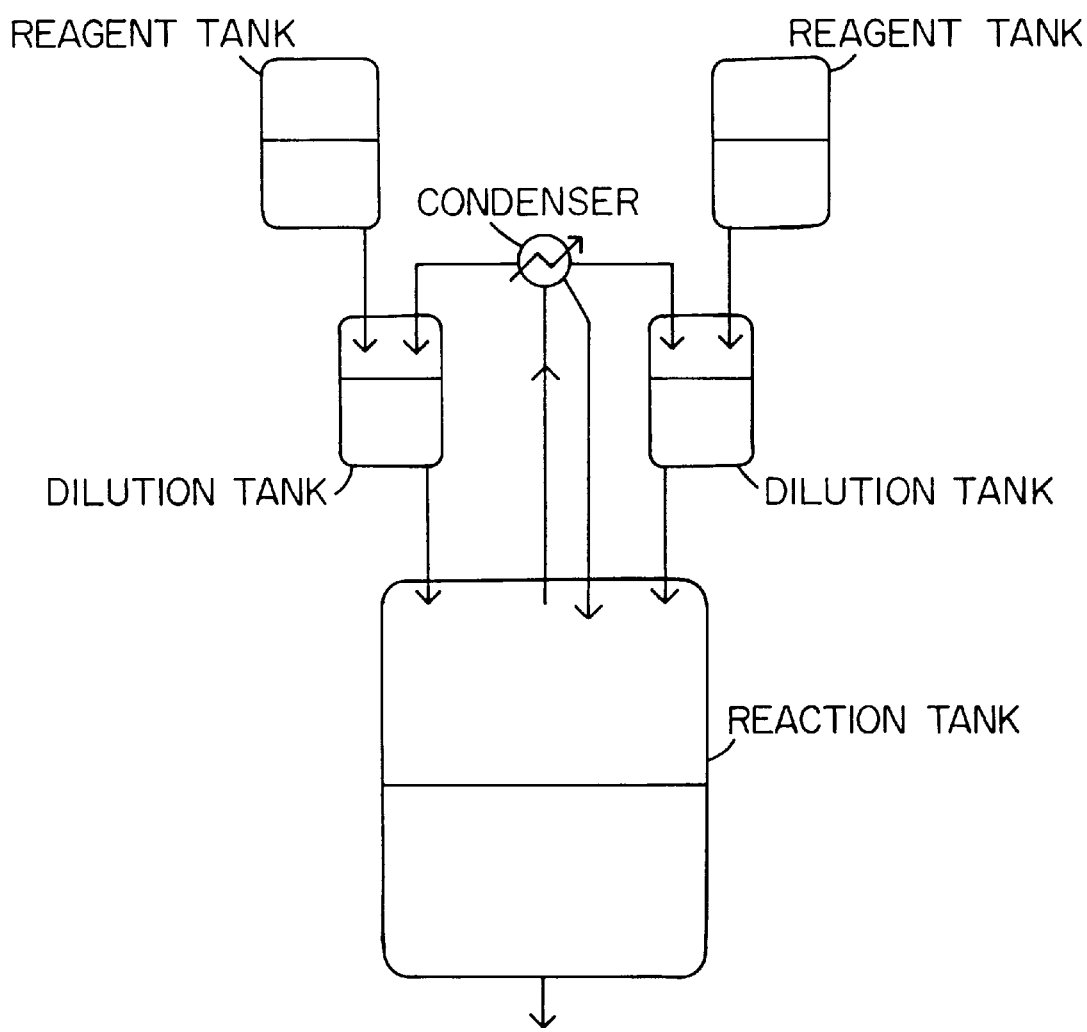
FIG. 4 is a flow diagram wherein part of the condensate is returned to the reaction tank.

Further modifications are shown in FIGS. 3 and 4. In FIG. 3, part of the condensate is returned to the reaction tank.

FIG. 4 represents a scheme wherein no refluxing is involved and the dilution comes from the addition of the carrier or solvent to the reaction tank.

Figure 5:
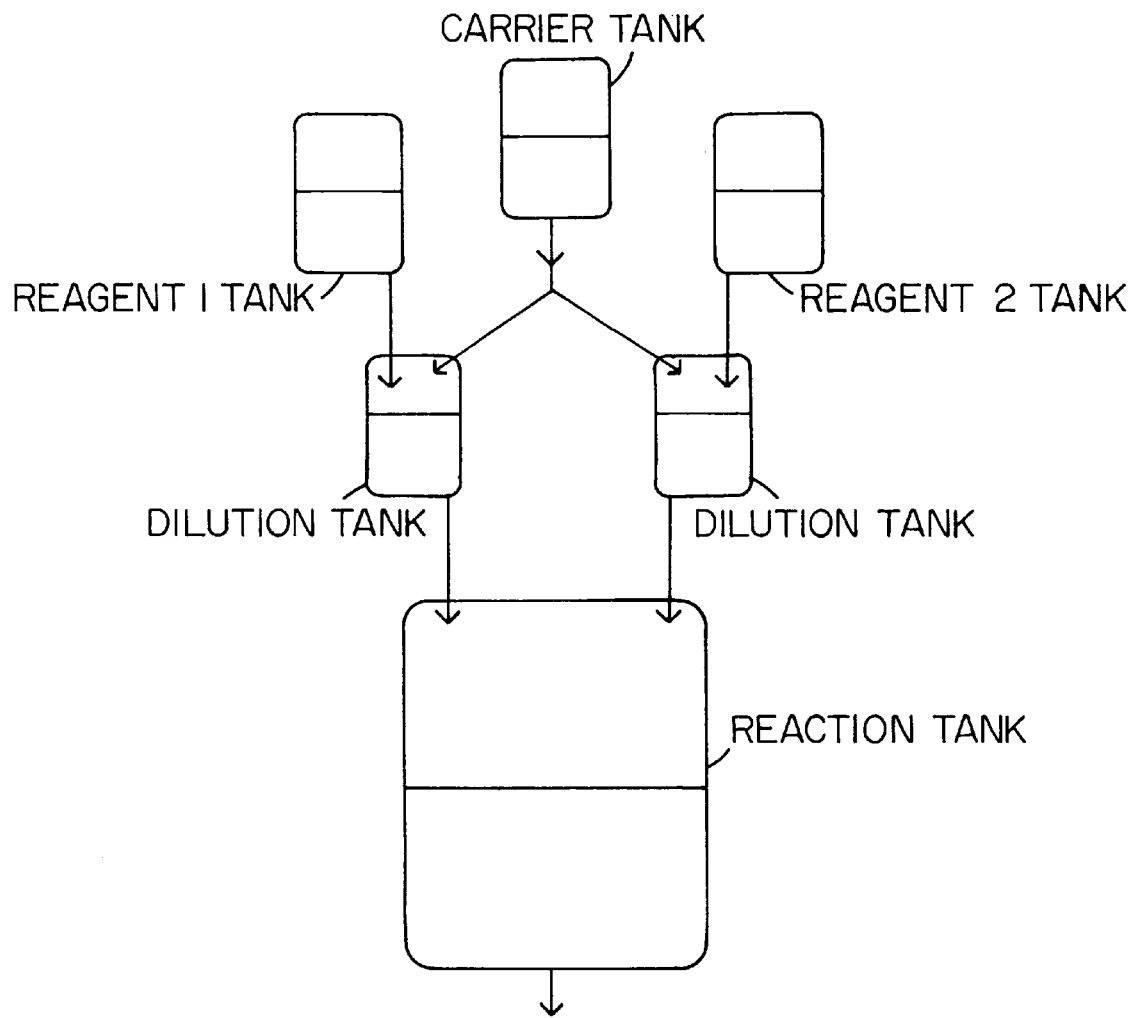
FIG. 5 is a flow diagram wherein the carrier is used to dilute the reagents before the reagents are added to the reaction tank.

FIG. 5 represents yet another modification of the invention wherein the carrier is used to dilute the reagents before the reagents are added to the reaction tank. The use of the dilution tanks is optional. The carrier can be added to the stream of the reagents 1 and 2 without using a dilution tank. The degree of dilution can be varied by varying the proportion of the reagents to the carrier.

Yet another variation is, referring to all the Figures, replacing the condenser with a fractionating column, whereby water formed in the reaction can be removed. Ethylene glycol can be added back into the system to make up for the loss from the fractionating column.

Ethylene glycol can be replaced by the higher analogs such as diethylene glycol or triethylene glycol and so on. It can also be replaced by 1,3-propandiol, 1,4-butandiol and the like.

It is well known to the people in the art that alkyl phosphates with at least a beta-hydrogen will undergo beta-elimination to produce the lower substituted phosphate esters and eventually to phosphoric acid. It is therefore, another process to generate the antimony phosphate derivatives under the equivalent of high dilution conditions by heating a mixture of the tri-alkyl phosphate and antimony acetate/ethylene glycol solution or antimony oxide/ethylene glycol solution or antimony ethylene glycoxide/ethylene glycol solution and the like. The heating will release the phosphoric acid slowly and is thus equivalent to the mixing under high dilution conditions.

Figure 6:
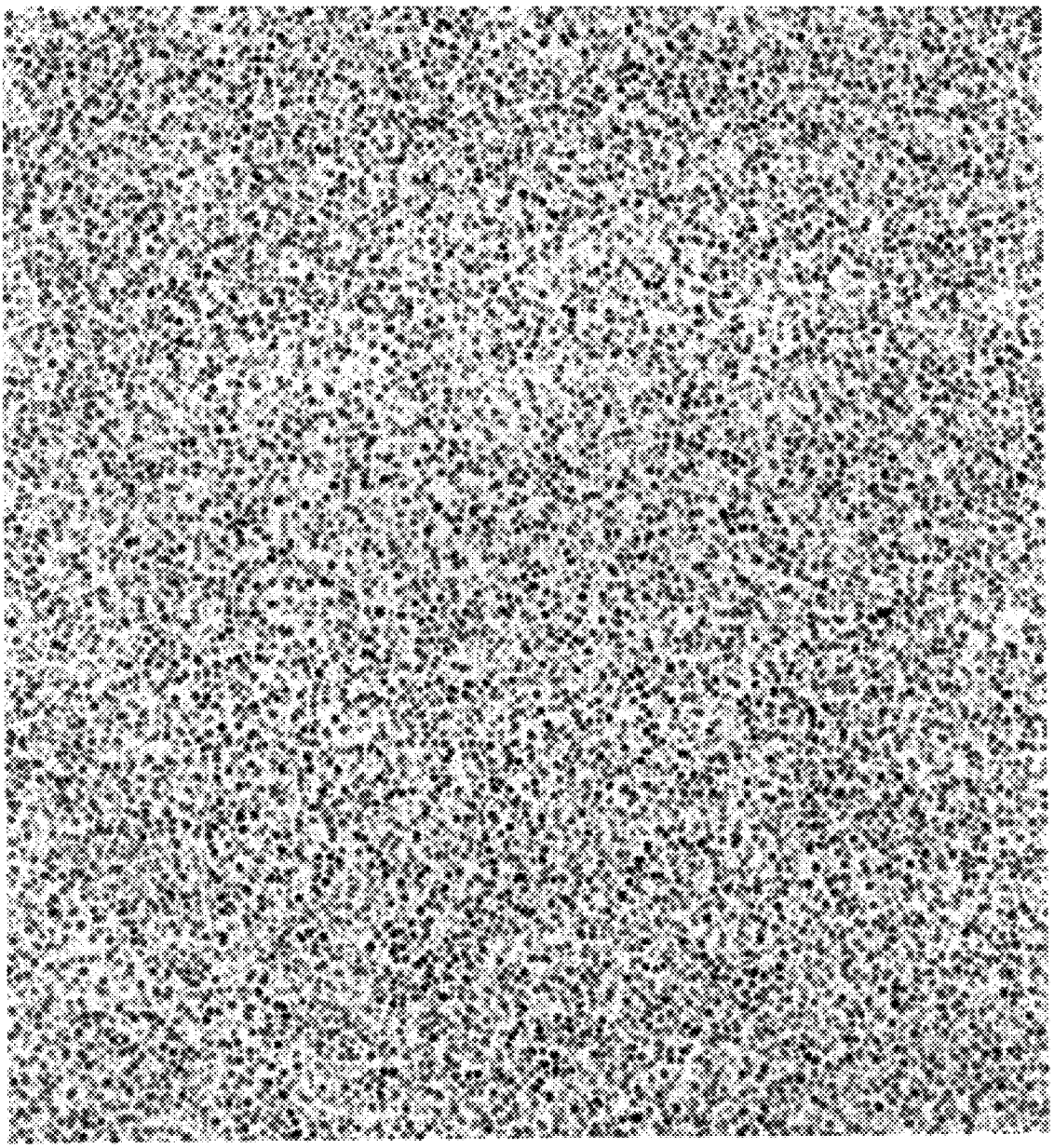
FIG. 6 is an electromicrograph of the molecular aggregates of the present invention taken at 30,000×.
Figure 7:
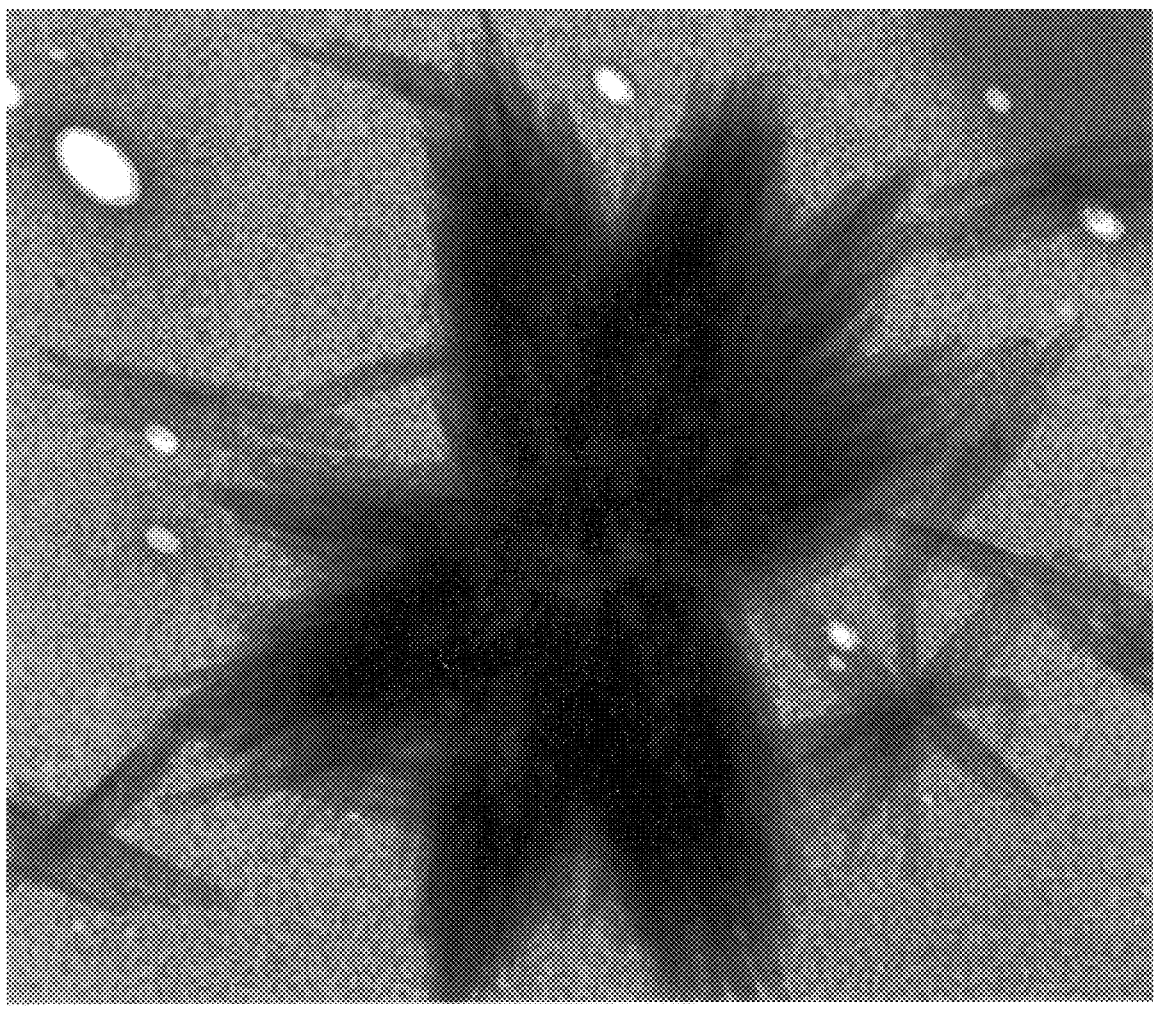
FIG. 7 is an electromicrograph taken at 30,000× of the particles obtained by mixing the two reagents at room temperature.

An electromicrograph of the molecular aggregates taken with a transmission electron microscope is shown in FIG. 6. The aggregates were separated from the mother liquor via centrifugation using an Beckman Airfuge operated at 100,000 rpm. The aggregates were spun down onto the TEM target directly for analysis. FIG. 7 shows the morphology and size of the particles obtained by mixing the two reagents at room temperature.

EXAMPLES

Figure 8:
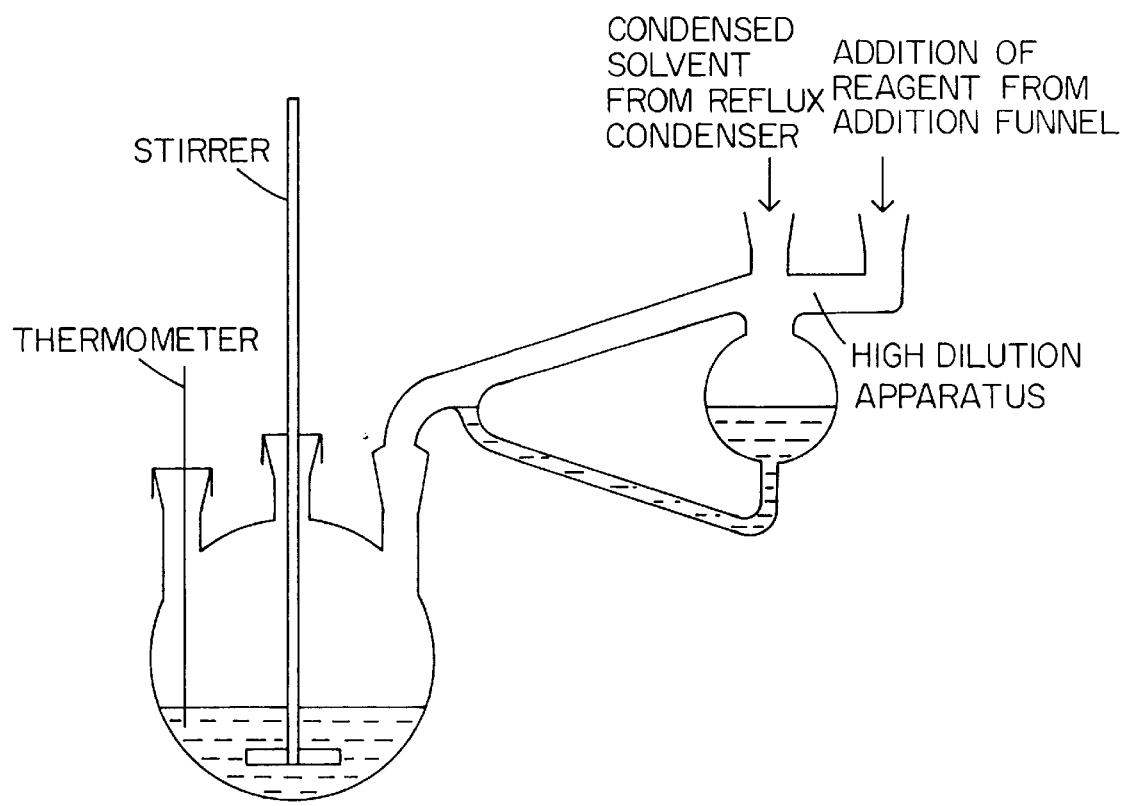
FIG. 8 is a diagram of the apparatus used in the examples of the present invention.

Preparation of Sub-Visual Molecular Aggregates Composed of Antimony Phosphate Derivatives The general set up is shown in FIG. 8. The equipments were purged with nitrogen and the experiment was performed with a static blanket of nitrogen inside the equipments. Ethylene glycol (133.56 g) was added to the 500 mL three neck round bottom flask to compensate for the hold up in the high dilution apparatus. A solution of antimony ethylene glycoxide (55.69 g, 0.9711 wt % Sb in ethylene glycol) was placed into the 500 mL three neck round bottom flask provided with a stirrer, a thermometer and a high-dilution apparatus (refer to FIG. 8). A solution of phosphoric acid (66.78 g, 0.2311 wt % P in ethylene glycol) was placed into an addition funnel (not shown) attached to the high-dilution apparatus. The content of the reaction flask was heated to reflux with a reflux rate of 357 mL/hour. When the bulb in the high-dilution apparatus was filled with ethylene glycol from reflux, the addition of phosphoric acid from the addition funnel was started. The addition was finished in the course of 2 hours 56 minutes. Reflux was then maintained for an additional 90 minutes. Heating was removed and the product mixture was allowed to cool to room temperature. A clear liquid resulted and it remained clear at room temperature for extended periods of time. X-ray fluorescence analysis showed that the liquid has an antimony concentration of 0.235% by wt based on the antimony cation. Transmission electron microscopy (sample dilution, 1:100, centrifuged onto target at 100,000 rpm using a Beckmann Airfuge with an ACR-90 rotor) revealed mostly discrete particles about 20 nm in diameter as shown in FIG. 6.

Figure 9:
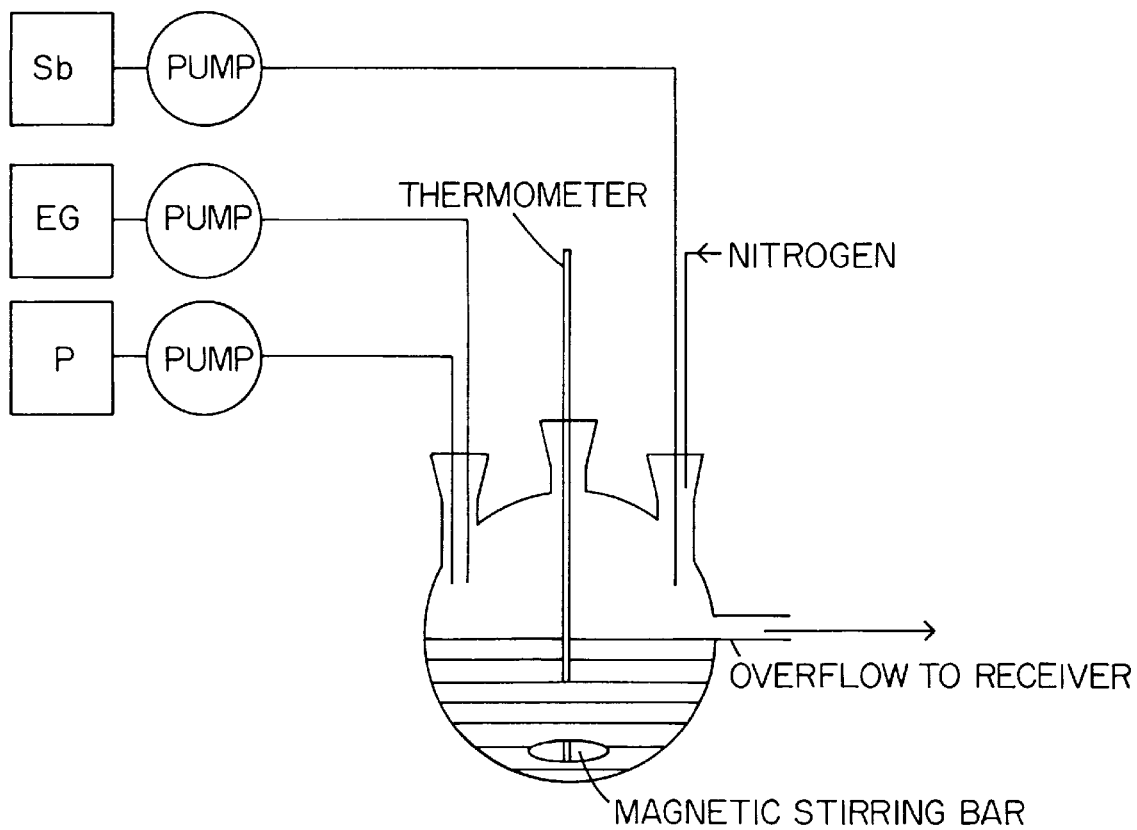
FIG. 9 is a diagram of the apparatus used in the examples of the present invention.

Continuous Process for the Preparation of Sub-Visual Molecular Aggregates Composed of Antimony Phosphate Derivatives The equipment was set up as shown in FIG. 9. The equipments were purged with nitrogen and the experiment was performed with a static blanket of nitrogen inside the equipments. A solution of antimony ethylene glycoxide in ethylene glycol (150 mL, 0.971 wt % Sb) was placed into one of the reagent reservoir and a solution of phosphoric acid in ethylene glycol (150 mL, 0.231wt % P) was placed into the other reagent reservoir. The carrier reservoir was charged with 1000 mL of ethylene glycol (EG).

Ethylene glycol (117.5 mL) was charged to the 250 mL three neck round bottom flask with a side arm until the ethylene glycol start overflowing from the side arm. The ethylene glycol in the flask was then heated to 190° C. with agitation. The flows from the reagent reservoirs (10.5 mL/hour) and the carrier reservoir (104 mL/hour) were started. After 3 hours, when steady state had been achieved, the overflow from the reaction flask was collected in a product vessel. The particles isolated by centrifuge as described earlier had an average particle size of about 20 nm.

Preparation of Sub-Visual Molecular Aggregates Composed of Antimony Phosphate Derivatives via Reversed Addition The procedure as described in the first procedure was repeated except that the phosphoric acid/ethylene glycol solution was placed in the 500 mL three neck round bottom flask while the antimony ethylene glycoxide/ethylene glycol solution was added to the addition funnel. Again, a clear liquid resulted. Particles isolated by the procedure described previously had the same morphology as those from the first procedure.

I claim:

1. A process comprises mixing, at temperatures between about 90° C. to 300° C., a first reactant solution comprising less than about $5 \times 10^{-3}$ moles/l of at least one antimony compound and at least one first diol having 2 to about 16 carbon atoms with a second reactant solution comprising less than about $30 \times 10^{-3}$ moles/l of at least one phosphorus stabilizer compound and at least one second diol to form sub-visual molecular aggregates comprising antimony phosphate derivatives.

2. The process of claim 1 wherein said antimony compound is selected from the group consisting of trivalent and pentavalent antimony acetates, oxides and mixtures thereof.

3. The process of claim 1 wherein said antimony compound is selected from the group antimony triacetate, antimony trioxide, antimony ethylene glycoxide, and mixtures thereof.

4. The process of claim 1 wherein said phosphorus stabilizer compound is selected from the group consisting of phosphoric acid, phosphorous acid, aryl phosphate esters, alkyl phosphate esters, aryl phosphites, alkyl phosphites, and mixtures thereof.

5. The process of claim 1 wherein said phosphorus stabilizer compound is selected from the group consisting of phosphoric acid, phosphorous acid, triethyl phosphate, trimethyl phosphate, diethyl hydrogen phosphate, ethyl dihydrogen phosphate, dimethyl hydrogen phosphate, methyl dihydrogen phosphate, triphenyl phosphate, and mixtures thereof.

6. The process of claim 1 wherein said phosphorus stabilizer compound is a reaction product of alkyl phosphate and ethylene glycol.

7. The process of claim 6 wherein said reaction product is selected from the group consisting of tris (2-hydroxyethyl) phosphate, bis (2-hydroxyethyl) hydrogen phosphate, 2-hydroxyethyl dihydrogen phosphate.

8. The process of claim 1 wherein said first and second diols are the same or different and are selected from the group consisting of aliphatic, cycloaliphatic or aromatic diprotic alcohol having from 2 to about 16 carbon atoms.

9. The process of claim 1 wherein said first and second diols are the same or different and are selected from the group consisting of ethylene glycol, 2,2,4,4-tetramethyl-1, 3-cyclobutanedliol, 1,2-propanediol, 1,3-propanediol, neopentyl glycol, 1,4-butanediol, 1,5-pentanediol, 1,6-hexanediol, trans- or cis-1,4-cyclohexanedimethanol, p-xylene glycol, and mixtures thereof.

10. The process of claim 1 wherein at least one of said first and second diols comprises ethylene glycol.

11. The process of claim 1 wherein said first reactant solution comprising less than about $4.3 \times 10^3$ moles/l of at least one antimony compound and said second reactant solution comprising less than about $4.3 \times 10^{-3}$ moles/l of at least one phosphorus stabilizer compound.

12. The process of claim 1 wherein said temperature is between about 90° C. to about 300° C.

13. The process of claim 1 wherein said temperature is between about 130 to about 220° C.

14. The process of claim 1 wherein said temperature is between about 140 to about 180° C.

15. A process comprises mixing a first reactant solution comprising less than about $5 \times 10^{-3}$ moles/l of at least one antimony compound and at least one first diol having 2 to about 16 carbon atoms with a second reactant solution comprising less than about $30 \times 10^{-3}$ moles/l of at least one phosphate ester and at least one second diol to form a mixture; and heating said mixture to temperatures between about 25 to about 300° C. for time periods between about 5 minutes to about 1 week, to form sub-visual molecular aggregates comprising antimony phosphate derivatives.

16. The process of claim 15 wherein said temperature is between about 90 to about 200° C. and said time is between about 1 hour and about 5 hours.

17. A composition comprising at least one glycol and sub-visual antimony phosphate derivative particles which are suspended in said glycol.

18. The composition of claim 17 wherein said particles are present in a concentration greater than about $32 \times 10^{-3}$ moles/liter.

19. The composition of claim 17 wherein said particles remain in suspension for at least one week.

20. The composition of claim 17 wherein said particles comprise

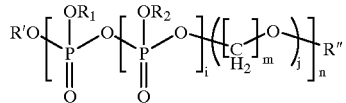

wherein m and n are the same or different and are integers of at least one, and i and j are the same, or different and are zero or integers of at least 1, R' and R" are the same or different and are selected from H, alkyl and aryl; and $R_1$ and $R_2$ the same or different and are selected from H, alkyl, aryl, hydroxy and alkyl ether.

21. The composition of claim 20 wherein R', R", $R_1$ and $R_2$ are independently selected from H and alkyl groups having 1–5 carbon atoms; m and n are from 1 to 50; and i and j are from 0 to 50.

22. The composition of claim 20 wherein m and n are from 1 to 10; and i and j are from 0 to 10.

* * * * *